Oct. 28, 1969 R. J. SARGENT 3,475,006
BALL VALVE

Filed June 6, 1967 2 Sheets-Sheet 1

INVENTOR
RONALD J. SARGENT

BY
Olsen and Stephenson
ATTORNEYS

Oct. 28, 1969  R. J. SARGENT  3,475,006
BALL VALVE

Filed June 6, 1967  2 Sheets-Sheet 2

INVENTOR
RONALD J. SARGENT

BY
Olsen and Stephenson
ATTORNEYS

United States Patent Office 3,475,006
Patented Oct. 28, 1969

3,475,006
BALL VALVE
Ronald J. Sargent, Ann Arbor, Mich., assignor to Thetford Engineering Corporation, Ann Arbor, Mich., a corporation of Michigan
Filed June 6, 1967, Ser. No. 644,018
Int. Cl. F16k 5/06, 51/00, 15/04
U.S. Cl. 251—285                                      11 Claims

ABSTRACT OF THE DISCLOSURE

A ball valve structure which has a valve housing formed in two sections with each section being substantially identically the same except for a valve stem bore in one section. The two sections when fastened together define the valve chamber and have a transverse diagonal plane of separation passing through the center of the chamber. The plane of separation is sealed by an O-ring in a groove which is inclined slightly to said plane. Sealing means for the ball valve member and its stem are provided in the form of sleeve-like resilient elements seated in annular channels, which are coaxially disposed relative to the inlet and outlet passageways, such elements bearing against the outer surface of the ball valve member. The valve body also has limit stops for the stem and an adapter is carried by the stem for selectively determining the direction of rotation of the valve stem for opening and closing the valve.

BACKGROUND OF THE INVENTION

The present invention relates to ball valves and is particularly adapted for use in water supply conduits leading to toilets and the like. When so used, the valve is normally made a part of the flushing mechanism for the toilet. Under these circumstances, it is particularly desirable that the ball valve member turn easily and that sealing elements be provided in the ball valve preventing leakage.

Ball valves are well known in the prior art, but the ball valves which have been manufactured and used in the past have not proved to be entirely satisfactory when used in connection with flushing mechanisms of toilets. One of the problems which have been encountered has been the relatively high torque that must be applied to the ball valve member for turning the same. This has been due in part to the sealing devices employed within the valves to prevent leaking around the stem of the valve during usage. Normally, packing is provided around the valve stem which must be maintained tightly around the stem to prevent leakage, and by virtue of this arrangement increased torque is necessary in order to turn the valve stem. Other sealing and packing arrangements have been employed, but they have not proved to be entirely satisfactory.

SUMMARY OF THE INVENTION

The present invention has overcome the shortcomings of the prior art outlined above, and in addition has overcome various other shortcomings that are inherent in the manufacture and use of ball valves presently available on the market.

According to a preferred embodiment of the present invention, a ball valve is provided comprised of a valve body having a pair of sections each of which includes an outwardly extending passageway. The sections when secured together define a valve chamber with the passageways communicating therewith in axial alignment with the axis passing through the center of the chamber, and one of the sections has a valve stem bore, the axis of which intersects the axis of the passageways at the center of the chamber. The sections have a transverse diagonal plane of separation passing through the intersection of the axes and the center of the valve chamber. A movable ball valve member is operably mounted in the valve chamber and has a stem extending outwardly through the bore in the one section. The ball valve member has a diametral passageway therethrough and is rotatable about the axis of the stem between a position in register with the passageways and a position out of register therewith. A novel and unique sealing arrangement is provided between the ball valve member and the valve body to prevent leakage during use of the valve and to provide a relatively free turning ball valve member. This is accomplished by each of the sections having an annular channel coaxial with and surrounding the outwardly extending passageway and opening to the valve chamber. A sealing sleeve member is seated in each annular channel and has a relatively short resilient lip projecting radially inwardly, said lip being deflected away from the valve chamber by the external surface of the ball valve member. This arrangement effects a liquid tight seal at all times at the surface of the ball valve member, and as a result liquid does not have an opportunity to flow outwardly between the valve stem and the valve body, thereby avoiding the necessity of the tight packing that normally is present in ball valve structures of this general character.

The preferred embodiment of the present invention also has other features which contribute to making it a substantial improvement over the prior art. One of these features is the sealing arrangement between the two sections of the valve body. As previously indicated, the sections have a transverse diagonal plane of separation passing through the center of the valve chamber, and the adjacent surfaces of the sections which form the plane of separation, define between them a sealing ring groove surrounding the valve chamber. The groove is inclined to the plane of separation so that the full depth of the groove at a location most remote from the valve stem is entirely in the section having the valve stem passed therethrough, and the full depth of the groove at a location nearest the valve stem is entirely in the other section. A sealing ring is held in compression between the sections within this groove. This unique arrangement is significant because it permits the plane of separation to be as near vertical as possible, thereby assuring an optimum fit between the sections when the sections are secured together. By locating the groove in the manner described, the section containing the bore for the valve stem will provide maximum strength around the valve stem.

Another novel feature of the present invention is the arrangement whereby the two sections of the valve body are identically the same except for the one section having a bore for receiving the valve stem of the ball valve member. By virtue of this arrangement, one set of tooling can be used for making halves or sections of the valve body, the only change that is required during the manufacture of the two sections being that a core element must be inserted into the molds for forming the sections when forming the section having the valve stem bore.

Still another feature of the present invention is the unique arrangement wherein the valve body provides limit stops for limiting movement of the ball valve member between a fully open and a fully closed position. This arrangement is such that an adapter can be used in conjunction with the ball valve stem for setting the valve stem so that the direction for turning the valve to a closed position can be selected at the option of the installer.

Accordingly, it is an object of the present invention to provide an improved ball valve which is constructed and arranged to provide easy turning of the ball valve member without leakage occurring around the valve stem. It is still another object of the present invention to provide a ball valve member which is characterized by its low cost of construction and which has improved stop means for controlling the limits of movement of the ball valve member.

Other objects of this invention will appear in the following description and appended claims, reference being had to the accompanying drawings forming a part of this specification wherein like reference characters designate corresponding parts in the several views.

Figure 1:
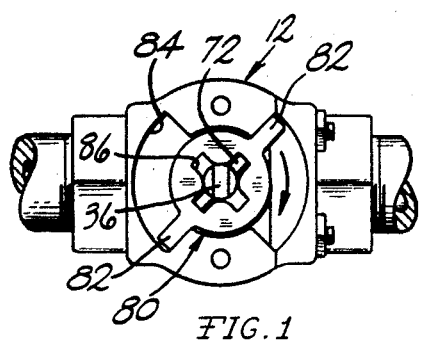
FIGURE 1 is a top plan view of an embodiment of the invention showing an adapter placed in a selected position with respect to the valve stem, whereby the valve will be opened when the valve stem is turned in a clockwise direction.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DESCRIPTION OF A PREFERRED EMBODIMENT

The ball valve 10 includes a valve body 12 which comprises a first section 14 and a second section 16. These sections are preferably formed identically the same with the exception that the first section 14 is provided with the valve stem bore 18. When secured together, the sections 14 and 16 define between them a valve chamber 20. The sections 14 and 16 have passageways 22 and 24, respectively, communicating with the valve chamber 20. These passageways 22 and 24 are coaxially aligned and pass through the center of the valve chamber 20. The passageways 22 and 24 are shown in communication with conduits 26 and 28 which are threadedly connected to sections 14 and 16.

A movable ball valve member 30 is operably supported in the chamber 20 and the bore 18. The ball valve member 30 is rotatable about the axis of its stem and has a diametral passageway 32 which is arranged so that it is out of register with the passageways 22 and 24 when in the position shown in FIGURE 5, and will be in register with these passageways when the valve body member 30 is turned ninety degrees from the position shown in FIGURE 5. It will be recognized from the showing in FIGURE 5 that the axis of rotation of the ball valve member 30 intersects the axis of the passageways 22 and 24 and that when the ball valve member 30 is turned to its open position, the axis of the diametral passageway 32 will be coaxial wtih these passageways.

Figure 3:
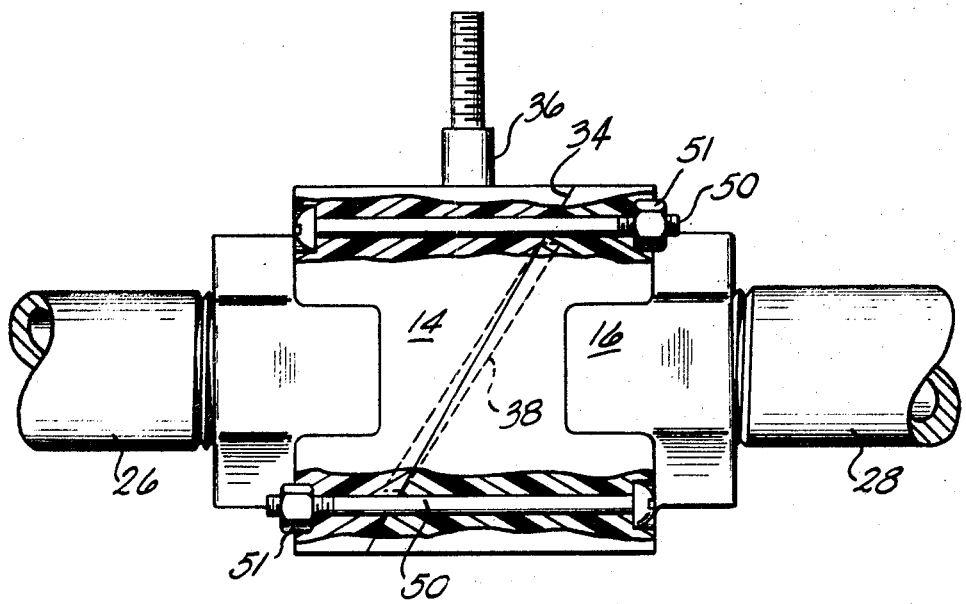
FIGURE 3 is an enlarged side elevation with portions broken away to show the manner in which the two sections of the valve body are secured together.
Figure 4:
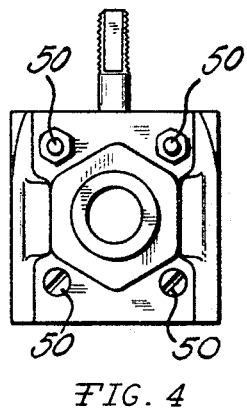
FIGURE 4 is an end elevation of the invention.
Figure 5:
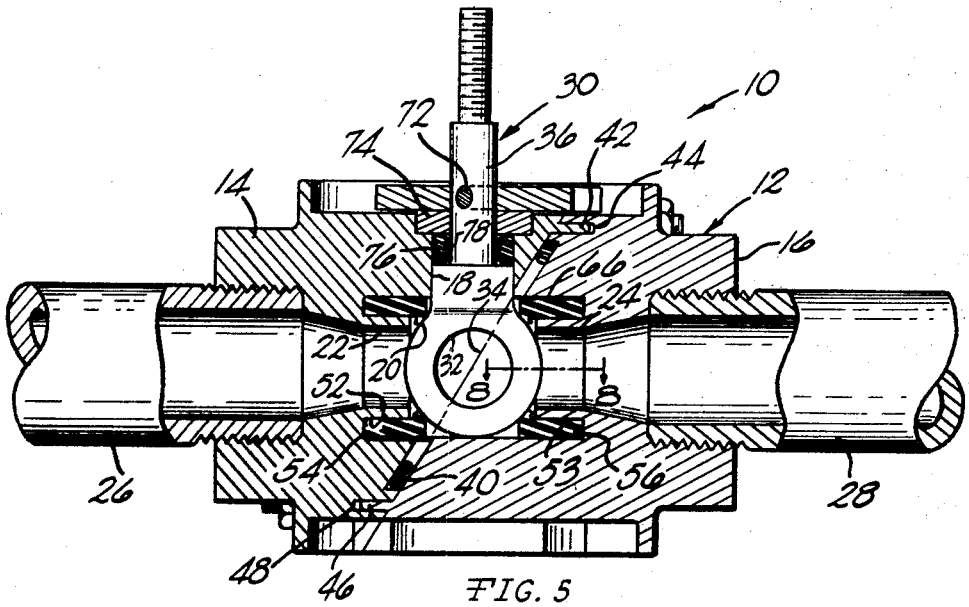
FIGURE 5 is an enlarged sectional view taken on the line 5—5 of FIGURE 2 showing internal portions of the ball valve.
Figure 6:
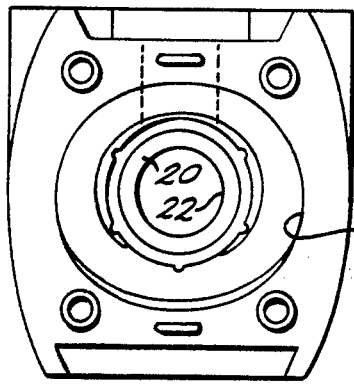
FIGURE 6 is an enlarged end elevation of one section of the valve body.
Figure 7:
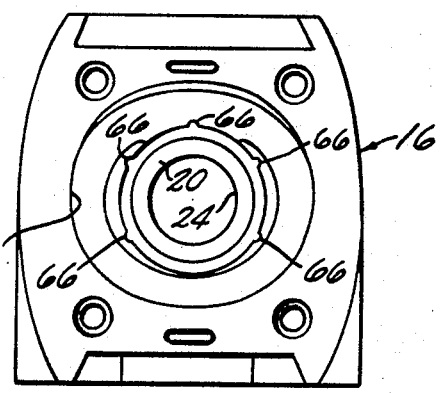
FIGURE 7 is a similar view of the other section of the valve body.

The sections 14 and 16 have a transverse diagonal plane of separation 34 which passes through the intersection of the axis of the passageways 22 and 24 and the axis of the stem 36 of ball valve member 30. These sections define between them a sealing-ring groove 38 in which is carried the O-ring or sealing-ring 40. As best seen in FIGS. 3 and 5, the groove 38 is inclined to the plane 34 so that the full depth of the groove at a location most remote from the valve stem 36 is entirely in the section 14 which has the bore 18 for the valve stem 36, and the full depth of the groove at a location nearest to the valve stem 30 is entirely in the section 16. By virtue of this arrangement, the plane 34 can be as near vertical as possible while still maintaining a strong structure between the groove 38 and the bore 18. It is desirable that the plane 34 be as near vertical as possible because this eliminates alignment problems when fitting and securing the sections 12 and 14 together. It will be appreciated that the greater the angle of plane 34 from the normal, the greater will be the tendency of the sections 14 and 16 to slide relative to one another when attempting to secure them together by means extending in a direction parallel to the axis of the passageways 22 and 24. To aid further in properly aligning and securing the sections 14 and 16 together, the section 14 has a tongue 42 adapted to be received in a slot 44 of section 16, and the section 16 has a tongue 46 adapted to be received in the slot 48 of section 14. When fitted together by means of the tongue and slots described, the bolts 50 and nuts 51 can be used to secure the valve body 12 together.

Figure 8:
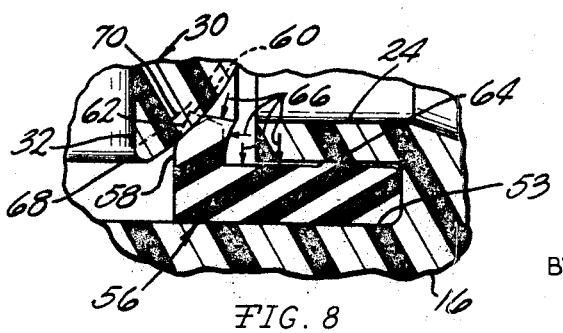
FIGURE 8 is an enlarged fragmentary section taken on the line 8—8 of FIGURE 5 illustrating the sealing arrangement provided between the ball valve member and the valve body.

One of the important features of the present invention is the arrangement for effecting a seal between the ball valve member 30 and the valve body 12 so that liquid does not pass between these elements. This is accomplished by providing an annular channel 52 in section 14 which is coaxial of passageway 22 and a similar channel 53 in section 16. Sealing sleeve member 54 is located in the annular groove 52 and a similar sleeve member 56 is located in the annular channel 53. As shown in FIGURE 8, the sleeve 56 has a relatively short resilient lip 58 projecting radially inwardly, its unstressed position being shown in dotted lines as at 60, and its stressed position, when assembled in place with the ball valve member 30 pressing against it being shown in solid lines. In its unstressed position the flat surface 62 is preferably inclined approximately 15° to a normal to the axis of the passageway 24. This surface is preferably impregnated with Teflon to provide a smooth bearing surface against which the surface of the ball valve member 30 can move. The illustrated sleeve 56 is made from a synthetic rubber, such as Buna-N, having a Shore durometer hardness of about ninety. The sleeve 56 also preferably has an annular rib 64 for providing a press fit of the sleeve within the annular channel 53. In order to facilitate fitting the sleeve 56 into channel 53, the latter has axial grooves 66 in the outer wall to allow escape of air from the channel 53 which is trapped therein when inserting the sleeve 56 in place.

The location of the rig 64 and the orientation of the sleeve 56 relative to the internal portions of the section 16 are also significant features. This arrangement assures that the pressure of liquid from passageway 24 can be used in optimum manner so as to act constantly on sleeve 56 to maintain a liquid-tight seal between surface 62 and ball valve member 30. Thus, the liquid pressure will act on sleeve 56 in the directions represented by the pressure-indicating arrows 66. These pressure forces complement the internal forces within the stressed sleeve also functioning to urge the lip 58 to its unstressed position shown in dotted lines 60, thereby providing a very effective seal.

Another feature of the shape and orientation of the sleeve 56 and ball valve member 30 is that the juncture of the outer spherical surface and the diametral passageway 32 of member 30 is rounded as at 68 so that the leading edge will travel along a path defined by broken line 70 during turning of member 30. It will be observed that the line 70 is radially inwardly of the terminal edge of lip 58, thus assuring that lip 58 will always be deflected outwardly by ball valve member 30, during turning action.

Figure 2:
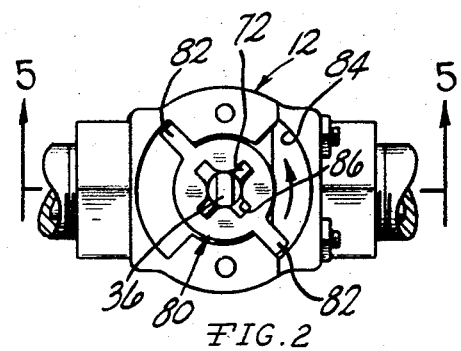
FIGURE 2 is a similar view to that of FIGURE 1, but showing the adapter in a second position wherein the valve will be opened when the valve stem is turned in a counterclockwise direction.

Referring now to FIGURES 1, 2 and 5, still another feature of the present invention will be explained. As shown in FIGURE 1, a retaining pin 72 is tight-slip fitted transversely through the shaft 36 to perform two functions. Initially, it retains the bushing 74 in place, which in turn, cooperates in holding the O-ring 76 in compression between stem 36 and the bore 18 in section 14. To improve the bearing properties of the O-ring 76 around stem 36, a Teflon collar 78 is preferably employed.

The second function of pin 72 is to receive a stop adapter 80 in either of the two positions shown in FIGURES 1 and 2. The adapter 80 has radially projecting arms 82 which can travel in the cavity 84 in the outer surface of valve body 12. The cavity 84 has two diametrically opposite sectors of ninety degrees in which the arms can travel, thus limiting movement of the ball valve member 30 between a closed and an open position. The adapter 80 has transverse slots 86 so that it can be placed selectively over pin 72 in either of the positions shown in FIGURES 1 or 2. Thus, when in the FIGURE 1 position the valve will be opened by turning stem 36 in a clockwise direction as shown by the indicating arrow, and when in the FIGURE 2 position the valve will be opened by turning stem 36 in a counterclockwise direction, as shown by the indicating arrow in that figure.

Having thus described my invention, I claim:

1. A ball valve comprising a valve body having two identical sections except for the presence of a valve stem bore in one of said sections, each section including an outwardly extending passageway, said sections when secured together defining a valve chamber with said passageways communicating therewith in axial alignment and the axis of said bore intersecting the axis of said passageways, said sections having a transverse diagonal plane of separation passing through the intersection of the axes of the passageways and of the valve stem bore, a movable ball valve member operably mounted in said valve chamber and having a stem extending through the bore in said one section, said ball valve member being rotatable about the axis of the stem and having a diametral passageway therethrough and being movable between a position in register with said passageways and a position out of register therewith, the adjacent surfaces of said sections which form the plane of separation defining between them a sealing-ring groove surrounding said valve chamber, said groove being inclined to said plane so that the full depth of the groove at a location most remote from the valve stem is entirely in the section having said bore and so that the full depth of the groove at a location nearest said valve stem is entirely in the other section, and a sealing ring in said groove.

2. A rotary ball valve according to claim 1, wherein said adjacent surfaces have mating tongue-and-slot means extending in parallel relationship to the axis of said passageways for aligning said sections when securing the sections together.

3. A rotary ball valve according to claim 2, wherein bolt means for securing said sections together extend between said sections parallel to said axis of said passageways.

4. A ball valve comprising a valve body having a pair of sections each of which includes an outwardly extending passageway, said sections when secured together defining a valve chamber with said passageways communicating therewith in axial alignment and one of said sections having a valve stem bore therethrough the axis which intersects the axis of said passageways, said sections having a transverse diagonal plane of separation passing through the intersection of the axes of the passageways and of the valve stem bore, a movable ball valve member operably mounted in said valve chamber and having a stem extending through the bore in said one section, said ball valve member being rotatable about the axis of the stem and having a diametral passageway therethrough and being movable between a position in register with said passageways and a position out of register therewith, each of said sections having therein a continuous annular channel coaxial with and surrounding its outwardly extending passageway and closed on three sides and having an open end facing said valve chamber, and a sealing sleeve member seated in each annular channel and projecting outwardly therefrom through each opening, each sleeve member having a relatively short resilient lip projecting radially inwardly from the outwardly projecting end of the sleeve member, said lip being spaced axially from the open end of its associated channel and deflected within its elastic limit axially away from said valve chamber toward said associated channel by the external surface of said ball valve member.

5. A ball valve according to claim 4, wherein each of said sleeve members has a rib on its inner circumference press fitting against the inner wall of its channel.

6. A ball valve according to claim 4, wherein said sleeve members are a rubber-like material having a Shore durometer hardness of about 90.

7. A ball valve according to claim 4, wherein the surface of each lip engaged by said ball valve member is inclined about 15° from a normal to the axis of said passageways when in its unstressed condition.

8. A ball valve according to claim 7, wherein said sleeve members are a rubber-like material having a Shore durometer hardness of about 90 and said inclined surfaces are Teflon impregnated.

9. A ball valve according to claim 4, wherein each edge of said ball valve member at said diametral passage having a radius of dimension so that the leading edge when the member is rotated will be axially inward of the radially inner terminus of the associated lip.

10. A ball valve comprising a valve body having a pair of sections each of which includes an outwardly extending passageway, said sections when secured together defining a valve chamber with said passageways communicating therewith in axial alignment and one of said sections having a valve stem bore therethrough the axis of which intersects the axis of said passageways, said sections having a transverse diagonal plane of separation through the intersection of the axes of the passageways and of the valve stem bore, a movable ball valve member operably mounted in said valve chamber and having a stem extending through the bore in said one section, said ball valve member being rotatable about the axis of the stem and having a diametral passageway therethrough and being movable between a first position in register with said passageways and a second position out of register therewith, said valve body having a cavity on its outer surface surrounding said stem defining a ninety degree sector of revolution of said stem, and a stop adapter carried on said shaft for rotation therewith and having a projection cooperating with said cavity for restricting turning of said shaft in one direction to the first position of said ball valve member and in the other direction to the second position of said ball valve member, means on said shaft cooperating with said stop adapter to prevent relative angular movement when said adapter is in one axial position on said shaft but which permits relative angular movement in another axial position on said shaft, whereby said stop adapter is selectively movable on said shaft without removal therefrom to a second location for restricting turning of said shaft in said one direction to the second position of said ball valve member and in said other direction to the first position of said ball valve member.

11. A ball valve comprising a valve body having a pair of sections each of which includes an outwardly extending passageway, said sections when secured together defining a valve chamber with said passageways communicating therewith in axial alignment and one of said sections having a valve stem bore therethrough the axis of which intersects the axis of said passageways, said sections having a transverse diagonal plane of separation passing through the intersection of said axes, a movable ball valve member operably mounted in said valve chamber and having a stem extending through the bore in said one section, said ball valve member being rotatable about the axis of the stem and having a diametral passageway therethrough and being movable between a position in register with said passageways and a position out of register therewith, each of said sections having an annular channel coaxial with and surrounding its outwardly extending passageway and opening to said valve chamber, and a sealing sleeve member seated in each annular channel and having a relatively short resilient lip projecting radially inwardly, said lip being deflected within its elastic limit axially away from said valve chamber by the external surface of said ball valve member, each of said sleeve members fitting snuggly into its channel, and said channels have axially extending grooves in their radially outer walls to bleed air when inserting said sleeve members in place.

References Cited
UNITED STATES PATENTS

| | | | |
|---|---|---|---|
| 2,086,001 | 7/1937 | Shaw | 251—367 X |
| 2,494,091 | 1/1950 | Harris | 251—367 X |
| 2,712,454 | 7/1955 | Love | 251—309 X |
| 2,919,886 | 1/1960 | Hurst | 251—315 X |
| 2,945,666 | 7/1960 | Freeman et al. | 251—315 X |
| 3,236,496 | 2/1966 | Rosenstein et al. | 251—368 X |
| 3,334,862 | 8/1967 | Hookway | 251—317 X |
| 3,383,973 | 5/1968 | Gazal | 251—288 X |
| 3,214,133 | 10/1965 | Rogers et al. | 251—175 |

FOREIGN PATENTS

| | | |
|---|---|---|
| 1,369,501 | 7/1964 | France. |
| 892,599 | 3/1962 | Great Britain. |
| 6,950 | 3/1910 | Great Britain. |
| 181,962 | 6/1922 | Great Britain. |

M. CARY NELSON, Primary Examiner

MICHAEL O. STURM, Assistant Examiner

U.S. Cl. X.R.

251—315, 367